United States Patent
Brandau et al.

(10) Patent No.: US 11,248,078 B2
(45) Date of Patent: Feb. 15, 2022

(54) COLOR-STABLE NITRILE RUBBERS

(71) Applicant: ARLANXEO DEUTSCHLAND GMBH, Dormagen (DE)

(72) Inventors: Sven Brandau, Strasbourg (FR); Andreas Kaiser, Strasbourg (FR)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 181 days.

(21) Appl. No.: 15/536,315

(22) PCT Filed: Nov. 25, 2015

(86) PCT No.: PCT/EP2015/077669
§ 371 (c)(1),
(2) Date: Jun. 15, 2017

(87) PCT Pub. No.: WO2016/096352
PCT Pub. Date: Jun. 23, 2016

(65) Prior Publication Data
US 2017/0349687 A1 Dec. 7, 2017

(30) Foreign Application Priority Data
Dec. 19, 2014 (EP) .................................. 14290399

(51) Int. Cl.
*C08F 236/12* (2006.01)
*C08C 1/15* (2006.01)
*C08L 9/04* (2006.01)
*C08C 1/14* (2006.01)

(52) U.S. Cl.
CPC .............. *C08F 236/12* (2013.01); *C08C 1/14* (2013.01); *C08C 1/15* (2013.01); *C08L 9/04* (2013.01)

(58) Field of Classification Search
CPC ... C08L 9/04; C08C 19/20; C08C 1/15; C08C 1/14; C08F 6/22; C08F 236/12
See application file for complete search history.

(56) References Cited

U.S. PATENT DOCUMENTS

| 8,389,623 B2 * | 3/2013 | Obrecht | C08C 1/15 524/565 |
| 2011/0123747 A1 | 5/2011 | Obrecht et al. | |

FOREIGN PATENT DOCUMENTS

| JP | 2003-277431 | * | 10/2003 |
| JP | 2006-63247 | * | 3/2006 |
| JP | 5487541 | * | 3/2014 |
| WO | WO 2007/049651 A1 | * | 3/2007 |

OTHER PUBLICATIONS

JP 5487541; Mar. 2014; machine translation.*
JP 2003277431; Oct. 2003; machine translation.*
JP 2006-63247, Mar. 2006; machine translation.*
Experimental Report, submitted by Zeon Corporation on Feb. 23, 2018, during the opposition of corresponding European Patent No. 3 034 518.
Wikipedia online entry for "Hydrochinon," retrieved from the website de.wikipedia.org on Jul. 10, 2018.
Thieme Römpp entry for "Aluminiumsulfat," retrieved from the website roempp.thieme.de on Jul. 9, 2018.

* cited by examiner

*Primary Examiner* — Peter D. Mulcahy
(74) *Attorney, Agent, or Firm* — Norris McLaughlin, P.A.

(57) ABSTRACT

What are provided are colour-stable, low-salt nitrile rubbers and a process for production thereof under specific conditions for the coagulation and/or washing of the nitrile rubber. Additionally obtainable are the corresponding vulcanizable mixtures based on this nitrile rubber, a process for producing vulcanizates from these mixtures and the resultant vulcanizates having excellent processing properties.

15 Claims, No Drawings

COLOR-STABLE NITRILE RUBBERS

This application is a 371 of International Patent Application No. PCT/EP2015/077669, filed Nov. 25, 2015, which, in turn, claims priority of European Patent Application No. 14290399.6, filed Dec. 19, 2014.

The invention relates to a novel aluminium-containing nitrile rubber, to a process for the production thereof, to vulcanizable mixtures based on this nitrile rubber, and also to a process for producing vulcanizates from these mixtures and to the resultant vulcanizates.

Nitrile rubbers, also abbreviated to "NBR", are rubbers which are co- or terpolymers of at least one α,β-unsaturated nitrile, at least one conjugated diene and optionally one or more additional copolymerizable monomers.

NBR is prepared by emulsion polymerization, which initially gives an NBR latex. The NBR solid is isolated from this latex by coagulation by means of salts or acids. With regard to the coagulation of the latices with metal salts, it is known that much greater amounts are required for monovalent metal ions, for example in the form of sodium chloride, than for polyvalent metal ions, for example in the form of calcium chloride or magnesium chloride (Kolloid-Z. 154, 154 (1957)). Houben-Weyl (1%1), Methoden der Org. Chemie, Makromolekulare Stoffe 1 [Methods of Organic Chemistry, Macromolecular Substances 1], p. 484 further discloses that the use of polyvalent metal ions leads to "greater or lesser incorporation of the emulsifier in the product". According to Houben-Weyl (1961), Methoden der Org. Chemie, Makromolekulare Stoffe 1, p. 479, "not only is it necessary to very carefully wash out the electrolytes used again, but the finished product should also be free of the catalysts and emulsifiers from the batch". Even small residues of electrolytes result in turbid and cloudy pressed and injection-moulded parts, they spoil the electrical properties, and they increase the water absorption capacity of the finished product" (quotation). However, there is no hint in Houben-Weyl as to whether and to what degree the workup of the latex affects the processing reliability of the rubber or the ion content and associated properties.

In the last few years, there has been a rise in the demands from industry on colour-stable nitrile rubbers. Among the wide range of NBR rubbers, there is also a multitude of aluminium-precipitated types which often exhibit only inadequate colour stability or else have too high a salt content which can have an adverse effect on the product properties. The high salt content can be attributed to the special feature of precipitation by means of aluminium salts compared to a standard precipitation with calcium salts. Aluminium is more reactive than calcium and is more difficult to remove from the rubber through choice of suitable coagulation conditions because of its amphoteric characteristics. In addition, aluminium salts, unlike other typical precipitant salts, can catalyse unwanted side reactions which can lead to a colour change in the rubber or excessively rapid vulcanization. Nevertheless, aluminium-precipitated nitrile rubbers exhibit some very good properties for technical rubber articles, which is the reason why aluminium-precipitated nitrile rubbers are available on the market in spite of many problems with processing and properties.

DE102007024008A discloses the provision of storage-stable nitrile rubbers by coagulation of an NBR latex with a specific calcium precipitation, giving a rubber which, after coagulation, has a calcium content of at least 150 ppm and a chloride content of at least 40 ppm. Optionally, in addition to the calcium salts, further salts may be used in the coagulation, including aluminium salts, but no information is given as to how stable, low-salt nitrile rubbers are obtained by aluminium precipitation and subsequent workup.

JP 2006/063247A2 describes a compound composed of an ethylene-α-olefin copolymer and a nitrile rubber. In this case, the nitrile rubber is prepared by emulsion polymerization and the resultant latex is precipitated with aluminium sulphate at a pH of not more than 6. The precipitation is thus effected exclusively under acidic conditions. However, no information is given as to how the subsequent wash of the rubber crumbs is conducted and what conditions should be observed therein. Any influence that the coagulation and washing conditions have on the aluminium content in the end product, the colour stability or the processing reliability is neither studied nor suggested.

JP 5078427A2 describes the production of resins by a graft polymerization in emulsion. In this case, acrylates and acrylonitrile are polymerized in the presence of an NBR latex in order thus to obtain the desired resin. These latices are coagulated by a combination of aluminium salts and magnesium salts, the precipitation being conducted at a pH in the range from 2 to 7 and the wash likewise at a pH in the range from 4 to 7. No association is made between the precipitation conditions described and the salt or ion contents in the rubbers or the processing reliability thereof.

JP S46/039477 describes a flocculation or coagulation process for synthetic rubber latex, in which basic aluminium chloride and basic aluminium sulphate are added individually or as a mixture to the rubber latex. It is stated that no particular mode of treatment is required in the use of the coagulants mentioned. Since the coagulants can be easily diluted in water, they can be poured into the latex in any amount diluted in water. Pouring in the aluminium coagulant reduces the pH of the latex, but the flocculation and coagulation is conducted by regulating the amount poured in such that the pH remains within a range from 6.5 to 7.0. There are no pointers to any particular significance of the adjustment of the pH during the coagulation and the subsequent wash for the purpose of attainment of a stable aluminium-precipitated nitrile rubber having a constant ion content.

DE 2 221 094 A describes the production of carboxylated nitrile rubbers having a high acrylonitrile content by means of emulsion polymerization and the exceptional oil resistance thereof. The resulting latices are coagulated by means of aluminium sulphate, but no details at all are reported with regard to the precipitation or the washing of the rubber crumbs obtained. There is no description either of the resulting ion contents or of the stability of the Al-precipitated rubbers, nor of the way in which these can be influenced.

According to Angew. Makromol. Chen. 1986,145-146, 161-179, an extremely effective measure for improving the storage stability of nitrile rubber is a selective hydrogenation of the double bonds that originate from the butadiene with simultaneous retention of the triple bonds of the nitrile groups. The changes in properties achieved by the hydrogenation are desirable for many applications, but not for all. The hydrogenation is additionally complex and requires a number of additional process steps. Moreover, the hydrogenation worsens the glass transition temperatures compared to the unhydrogenated starting material. For this reason, hydrogenation is not a suitable solution to the problem for all applications.

DD 154 702 discloses a process for free-radical copolymerization of butadiene and acrylonitrile in emulsion, which is controlled via a specific, advantageously computer-aided metered addition programme for the monomers and the molecular weight regulator, for example tert-dodecyl mercaptan, and in which the latices obtained are worked up by coagulation in an acidic medium to give the solid rubber. A significant advantage of the process is stated to be that due to the use of acids in the coagulation the resin soaps and/or fatty acid soaps employed as emulsifiers remain in the rubber, i.e., are not washed out as in other processes. As well as having the advantage of good properties of the NBR, this is said particularly to improve the economy of the process and to avoid wastewater pollution by washed-out emulsifier. For the NBR copolymers obtained with 10%-30% by weight of acrylonitrile, it is stated that they feature good elasticity and low-temperature properties combined with elevated swell resistance and advantageous processibility. No measures that enable influencing of the stability of the nitrile rubber, especially for aluminium precipitations, can be inferred from the teaching of this patent.

EP-A-0 692 496, EP-A-0 779 301 and EP-A-0 779 300 each describe nitrile rubbers having the common feature of containing 10%-60% by weight of unsaturated nitrile and having a Mooney viscosity in the range of 15-150 or, according to EP-A-0 692 496, of 15-65 and each having at least 0.03 mol of a $C_{12}$-$C_{16}$-alkylthio group per 100 mol of monomer units, this alkylthio group containing at least three tertiary carbon atoms and one sulphur atom bonded directly to at least one of the tertiary carbon atoms. The NBR is produced in each case in the presence of a $C_{12}$-$C_{16}$-alkyl thiol of appropriate structure as molecular weight regulator which functions as a "chain transfer agent" and is thus incorporated into the polymer chains as an end group.

It is stated that the nitrile rubbers according to EP-A-0 779 300 have a breadth "ΔAN" (AN=unsaturated nitrile) of the composition distribution of the unsaturated nitrile in the copolymer in the range of 3-20. It is a feature of the preparation process that only 30%-80% by weight of the total amount of monomer is used on commencement of polymerization and the residual amount of monomer is not metered in until a polymerization conversion of 20%-70% by weight.

It is stated that the nitrile rubbers according to EP-A-0 779 301 comprise 3%-20% by weight of a fraction having a low molecular weight having a number-average molecular weight M. of less than 35 000. The process for the production of said rubbers differs from that of EP-A-O 692 496 in that only 10%-95% by weight of the alkythiol is mixed into the monomer mixture prior to the polymerization and the residual amount of the alkylthiol is not metered in until attainment of a polymerization conversion of 20%-70% by weight.

With regard to latex coagulation, EP-A-0 692 496, EP-A-0 779 301 and EP-A-0 779 300 disclose that any desired coagulants may be used. Inorganic coagulants mentioned and used are calcium chloride and aluminium chloride. The focus is on nitrile rubbers which are essentially halogen-free and are obtained by conducting the latex coagulation in the presence of a nonionic surface-active auxiliary and with use of halogen-free metal salts such as aluminium sulphate, magnesium sulphate and sodium sulphate. No detailed parameters are given for the precipitation of the latex and subsequently required wash of the rubber crumbs. No statement is made as to the stability of an Al-precipitated rubber depending on the pH values in the precipitation and wash.

In summary, it can be stated that no process has been described to date enables the synthesis of aluminium salt-precipitated nitrile rubbers which predictably have good processing reliability, good colour stability and a particular aluminium content.

It was thus an object of the present invention to provide aluminium salt-precipitated nitrile rubbers which predictably have good colour stability and a particular aluminium content and hence simultaneously have very good properties in processing and a good vulcanization profile.

It has been found that, surprisingly, the desired low-salt and colour-stable nitrite rubbers, vulcanizable mixtures based thereon and vulcanizates based thereon having excellent vulcanizate properties are obtained when the precipitation of the nitrile rubber latices obtained after the polymerization is effected with observation of specific conditions by means of aluminium salts at acidic pH and the subsequent washing of the rubber crumbs at basic pH.

The present invention thus provides a nitrile rubber containing repeat units of at least one α,β-unsaturated nitrile monomer and of at least one conjugated diene monomer and having an aluminium index E according to the general formula (I) of less than 35.0 ppm/MU, based on the nitrile rubber, with $$E = \frac{[\text{Aluminium}]}{\text{Mooney viscosity}} \qquad (I)$$

in which
[aluminium] is the aluminium content of the nitrile rubber in ppm and
Mooney viscosity is the value of the Mooney viscosity (ML 1+4 at 100° C.) of the nitrile rubber, reported in Mooney units (MU).

The aluminium content "[aluminium]" is determined by ICP-OES (inductively coupled plasma-optical emission spectrometry) at a wavelength of 309.271 nm against calibration solutions adjusted with an acid matrix. For the determination of the aluminium content, the method which follows has been found to be useful and is used in the context of this invention. 0.5 g of the nitrile rubber is digested by dry ashing at 550° C. in a platinum crucible with subsequent dissolution of the ash in hydrochloric acid. After suitable dilution of the digestion solution with deionized water, the aluminium content is determined by ICP-OES (inductively coupled plasma-optical emission spectrometry) at a wavelength of 309.271 nm against calibration solutions adjusted with an acid matrix. According to the concentration of the elements in the digestion solution and/or sensitivity of the measuring instrument used, the concentrations of the sample solutions for each of the wavelengths used are fitted to the linear range of the calibration (B. Weiz "Atomic Absorption Spectrometry", 2nd Ed., Verlag Chemie, Weinheim 1985, P. 395)

The nitrile rubbers of the invention have an aluminium index E according to the general formula (I) of not more than 35/ppm/MU, preferably in the range from 3 ppm/MU to not more than 35 ppm/MU, more preferably in the range from 5 ppm/MU to less than 35 ppm/MU and most preferably in the range from 7 ppm/MU to less than 35 ppm/MU, based on the nitrile rubber.

Surprisingly, the nitrile rubbers of the invention have the desired very good processing characteristics in the form of considerable scorch stability and exhibit good optical characteristics after ageing. Scorch stability can be measured via the scorch characteristics and the scorch time $t_5$ to DIN53523. In this context, the scorch time $t_5$ describes the time in minutes from the commencement of measurement until the Mooney viscosity rises by 5 Mooney units above the viscosity minimum. For practical use, even a reduction in the scorch time $t_5$ by 20 to 30 seconds leads to relevant improvements in processing.

The present invention further provides a process for producing nitrile rubbers by emulsion polymerization of at least one α,β-unsaturated nitrile monomer and at least one conjugated diene monomer, characterized in that
(i) the latex which contains the nitrile rubber and is obtained after the polymerization is coagulated using at least one aluminium salt, the coagulation being effected at a pH in the range from 1 to 4.5, preferably from 1 to 4, more preferably from 1 to 3.75 and especially from 1 to 3.5, and
(ii) the subsequent wash of the nitrile rubber is conducted at a pH in the range from 6 to 12, preferably from 6.25 to 11, more preferably from 6.5 to 10.5 and especially from 6.75 to 10.5.

The present invention further provides a vulcanizable mixture comprising the nitrile rubber of the invention, a process for producing this vulcanizable mixture, vulcanizates based on this vulcanizable mixture and a process for producing such vulcanizates.

Nitrile Rubber:

The optionally hydrogenated nitrile rubbers of the invention have repeat units of at least one α,β-unsaturated nitrile, at least one conjugated diene and optionally one or mom further copolymerizable monomers.

Any conjugated diene may be present in the nitrile rubber. Preference is given to using ($C_4$-$C_6$) conjugated dienes. Particular preference is given to 1,2-butadiene, 1,3-butadiene, isoprene, 2,3-dimethylbutadiene, piperylene or mixtures thereof. Especially preferred are 1,3-butadiene and isoprene or mixtures thereof. Very particular preference is given to 1,3-butadiene.

The α,β-unsaturated nitrile used may be any known α,β-unsaturated nitrile, preference being given to ($C_3$-$C_5$)-α,β-unsaturated nitriles such as acrylonitrile, methacrylonitrile, ethacrylonitrile or mixtures thereof. Acrylonitrile is particularly preferred.

A particularly preferred nitrile rubber is a copolymer of acrylonitrile and 1,3-butadiene. In a suitable embodiment, no nitrile rubbers grafted using monomers, especially acrylates, are used.

Further copolymerizable termonomers used may, for example, be aromatic vinyl monomers, preferably styrene, α-methylstyrene and vinylpyridine, fluorinated vinyl monomers, preferably fluoroethyl vinyl ether, fluoropropyl vinyl ether, o-fluoromethylstyrene, vinyl pentafluorobenzoate, difluoroethylene and tetrafluoroethylene, or else N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline and N-phenyl-4-(4-vinylbenzyloxy)aniline, and also nonconjugated dienes, such as 4-cyanocyclohexene and 4-vinylcyclohexene, or else alkynes such as 1- or 2-butyne.

Alternatively, further copolymerizable termonomers used may be copolymerizable termonomers containing carboxyl groups, for example α,β-unsaturated monocarboxylic acids, esters thereof, α,β-unsaturated dicarboxylic acids, mono- or diesters thereof or the corresponding anhydrides or amides thereof.

The α,β-unsaturated monocarboxylic acids used may preferably be acrylic acid and methacrylic acid.

It is also possible to use esters of the α,β-unsaturated monocarboxylic acids, preferably the alkyl esters and alkoxyalkyl esters thereof. Preference is given to the alkyl esters, especially $C_1$-$C_{18}$ alkyl esters, of the α,β-unsaturated monocarboxylic acids, particular preference being given to alkyl esters, especially $C_1$-$C_{18}$ alkyl esters, of acrylic acid or of methacrylic acid, especially methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate. Preference is also given to alkoxyalkyl esters of the α,β-unsaturated monocarboxylic acids, particular preference to alkoxyalkyl esters of acrylic acid or of methacrylic acid, especially C2-C12-alkoxyalkyl esters of acrylic acid or of methacrylic acid, even more preferably methoxymethyl acrylate, methoxyethyl (meth)acrylate and ethoxyethyl (meth)acrylate. It is also possible to use mixtures of alkyl esters, for example those mentioned hereinabove with alkoxyalkyl esters, for example in the form of those mentioned hereinabove. It is also possible to use cyanoalkyl acrylate and cyanoalkyl methacrylates in which the number of carbon atoms in the cyanoalkyl group is 2-12, preferably a-cyanoethyl acrylate, a-cyanoethyl acrylate and cyanobutyl methacrylate. It is also possible to use hydroxyalkyl acrylates and hydroxyalkyl methacrylates in which the number of carbon atoms in the hydroxyalkyl groups is 1-12, preferably 2-hydroxyethyl acrylate, 2-hydroxyethyl methacrylate and 3-hydroxypropyl acrylate; it is also possible to use acrylates or methacrylates containing fluorine-substituted benzyl groups, preferably fluorobenzyl acrylate and fluorobenzyl methacrylate. It is also possible to use acrylates and methacrylates containing fluoroalkyl groups, preferably trifluoroethyl acrylate and tetrafluoropropyl methacrylate. It is also possible to use α,β-unsaturated carboxylic esters containing amino groups, such as dimethylaminomethyl acrylate and diethylaminoethyl acrylate.

Further copolymerizable monomers used may additionally be α,β-unsaturated dicarboxylic acids, preferably maleic acid, fumaric acid, crotonic acid, itaconic acid, citraconic acid and mesaconic acid.

It is additionally possible to use α,β-unsaturated dicarboxylic anhydrides, preferably maleic anhydride, itaconic anhydride, citraconic anhydride and mesaconic anhydride.

It is additionally possible to use mono- or diesters of α,β-unsaturated dicarboxylic acids.

These α,β-unsaturated dicarboxylic mono- or diesters may, for example, be alkyl, preferably $C_1$-$C_{10}$-alkyl, especially ethyl, n-propyl, isopropyl, n-butyl, tert-butyl, n-pentyl or n-hexyl, alkoxyalkyl, preferably $C_2$-$C_{12}$-alkoxyalkyl, more preferably $C_3$-$C_8$-alkoxyalkyl, hydroxyalkyl, preferably $C_1$-$C_{12}$-hydroxyalkyl, more preferably $C_2$-$C_8$-hydroxyalkyl, cycloalkyl, preferably $C_5$-$C_{12}$-cycloalkyl, more preferably $C_6$-$C_{12}$-cycloalkyl, alkylcycloalkyl, preferably $C_6$-$C_{12}$-alkylcycloalkyl, more preferably $C_7$-$C_{10}$-alkylcycloalkyl, aryl mono- or diesters, preferably $C_6$-$C_{14}$-aryl mono- or diesters, where any diesters may also be mixed esters.

Particularly preferred alkyl esters of α,β-unsaturated monocarboxylic acids are methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate, 2-propylheptyl acrylate and lauryl (meth)acrylate. In particular, n-butyl acrylate is used.

Particularly preferred alkoxyalkyl esters of the α,β-unsaturated monocarboxylic acids are methoxyethyl (meth)acrylate, ethoxyethyl (meth)acrylate and methoxyethyl (meth)acrylate. In particular, methoxyethyl acrylate is used.

Particularly preferred hydroxyalkyl esters of the α,β-unsaturated monocarboxylic acids are hydroxyethyl (meth)acrylate, hydroxypropyl (meth)acrylate and hydroxybutyl (meth)acrylate.

Other esters of the α,β-unsaturated monocarboxylic acids used are additionally, for example, polyethylene glycol (meth)acrylate, polypropylene glycol (meth)acrylate, glycidyl (meth)acrylate, epoxy (meth)acrylate, N-(2-hydroxyethyl)acrylamide, N-(2-hydroxymethyl)acrylamide and urethane (meth)acrylate.

Examples of α,β-unsaturated dicarboxylic monoesters include
- monoalkyl maleates, preferably monomethyl maleate, monoethyl maleate, monopropyl maleate and mono-n-butyl maleate;
- monocycloalkyl maleates, preferably monocyclopentyl maleate, monocyclohexyl maleate and monocycloheptyl maleate;
- monoalkylcycloalkyl maleates, preferably monomethylcyclopentyl maleate and monoethylcyclohexyl maleate;
- monoaryl maleates, preferably monophenyl maleate;
- monobenzyl maleates, preferably monobenzyl maleate;
- monoalkyl fumarates, preferably monomethyl fumarate, monoethyl fumarate, monopropyl fumarate and mono-n-butyl fumarate;
- monocycloalkyl fumarates, preferably monocyclopentyl fumarate, monocyclohexyl fumarate and monocycloheptyl fumarate;
- monoalkylcycloalkyl fumarates, preferably monomethylcyclopentyl fumarate and monoethylcyclohexyl fumarate;
- monoaryl fumarates, preferably monophenyl fumarate;
- monobenzyl fumarates, preferably monobenzyl fumarate;
- monoalkyl citraconates, preferably monomethyl citraconate, monoethyl citraconate, monopropyl citraconate and mono-n-butyl citraconate;
- monocycloalkyl citraconates, preferably monocyclopentyl citraconate, monocyclohexyl citraconate and monocycloheptyl citraconate;
- monoalkylcycloalkyl citraconates, preferably monomethylcyclopentyl citraconate and monoethylcyclohexyl citraconate;
- monoaryl citraconates, preferably monophenyl citraconate;
- monobenzyl citraconates, preferably monobenzyl citraconate;
- monoalkyl itaconates, preferably monomethyl itaconate, monoethyl itaconate, monopropyl itaconate and mono-n-butyl itaconate;
- monocycloalkyl itaconates, preferably monocyclopentyl itaconate, monocyclohexyl itaconate and monocycloheptyl itaconate;
- monoalkylcycloalkyl itaconates, preferably monomethylcyclopentyl itaconate and monoethylcyclohexyl itaconate;
- monoaryl itaconates, preferably monophenyl itaconate;
- monobenzyl itaconates, preferably monobenzyl itaconate;
- monoalkyl mesaconates, preferably monoethyl mesaconate.

The α,β-unsaturated dicarboxylic diesters used may be the analogous diesters based on the aforementioned monoester groups, where the ester groups may also be chemically different groups.

Useful further copolymerizable monomers are additionally free-radically polymerizable compounds containing at least two olefinic double bonds per molecule. Examples of polyunsaturated compounds include acrylates, methacrylates or itaconates of polyols, for example ethylene glycol diacrylate, diethylene glycol dimethacrylate, triethylene glycol diacrylate, butane-1,4-diol diacrylate, propane-1,2-diol diacrylate, butane-1,3-diol dimethacrylate, neopentyl glycol diacrylate, trimethylolpropane di(meth)acrylate, trimethylolethane di(meth)acrylate, glyceryl di- and triacrylate, pentaerythrityl di-, tri- and tetraacrylate or -methacrylate, dipentacrythrityl tetra-, penta- and hexaacrylate or -methacrylate or -itaconate, sorbityl tetraacrylate, sorbityl hexamethacrylate, diacrylates or dimethacrylates of 1,4-cyclohexanediol, 1,4-dimethylolcyclohexane, 2,2-bis(4-hydroxyphenyl)propane, of polyethylene glycols or of oligoesters or oligourethanes having terminal hydroxyl groups. The polyunsaturated monomers used may also be acrylamides, for example methylenebisacrylamide, hexamethylene-1,6-bisacrylamide, diethylenetriaminetrismethacrylamide, bis(methacrylamidopropoxy)ethane or 2-acrylamidoethyl acrylate. Examples of polyunsaturated vinyl and allyl compounds include divinylbenzene, ethylene glycol divinyl ether, diallyl phthalate, allyl methacrylate, diallyl maleate, triallyl isocyanurate or triallyl phosphate.

The proportions of conjugated diene and α,β-unsaturated nitrile in the nitrile rubbers of the invention can vary within wide ranges. The proportion of, or the sum total of, the conjugated diene(s) is typically in the range from 20% to 95% by weight, preferably in the range from 40% to 90% by weight, more preferably in the range from 60% to 85% by weight, based on the overall polymer. The proportion of, or the sum total of, the α,β-unsaturated nitrile(s) is typically from 5% to 80% by weight, preferably 10% to 60% by weight, more preferably 15% to 40% by weight, based on the overall polymer. The proportions of the monomers in each case add up to 100% by weight.

The additional monomers may, according to the nature of the termonomer(s), be present in amounts of 0% to 40% by weight, based on the overall polymer. In this case, corresponding proportions of the conjugated diene(s) and/or of the α,β-unsaturated nitrile(s) are replaced by the proportions of the additional monomers, where the proportions of all monomers in each case add up to 100% by weight.

If esters of (meth)acrylic acid are used as additional monomers, this is typically done in amounts of 0.5% to 25% by weight.

If α,β-unsaturated mono- or dicarboxylic acids are used as additional monomers, this is typically done in amounts of less than 10% by weight.

The nitrogen content is determined in the nitrile rubbers of the invention to DIN 53 625 according to Kjeldahl. Due to the content of polar comonomers, the nitrile rubbers are typically ≥85% by weight soluble in methyl ethyl ketone at 20° C.

In a particularly suitable embodiment, nitrile rubbers, especially acrylonitrile-butadiene copolymers, used are not graft copolymers that have been obtained by grafting using further monomers, especially acrylates, onto the starting copolymer.

The nitrile rubbers have Mooney viscosities (ML (1+4 @100° C.)) of 10 to 160 Mooney units, preferably of 20 to 150 Mooney units, more preferably of 25 to 140 Mooney units. The Mooney viscosity is determined to ASTM D1646 on uncalendered ("unmassed") samples.

The glass transition temperatures of the nitrile rubbers are in the range of −80° C. to +20° C., preferably in the range of −70° C. to +10° C. and more preferably in the range of −60° C. to 0° C.

Preference is given to inventive nitrile rubbers, or optionally fully or partly hydrogenated nitrile rubbers, having repeat units of acrylonitrile, 1,3-butadiene and optionally of one or more further copolymerizable monomers. Preference is likewise given to nitrile rubbers having repeat units of acrylonitrile, 1,3-butadiene and one or more α,β-unsaturated mono- or dicarboxylic acids or esters or amides thereof, and especially repeat units of an alkyl ester of an α,β-unsaturated carboxylic acid, most preferably of methyl (meth)acrylate, ethyl (meth)acrylate, propyl (meth)acrylate, n-butyl (meth) acrylate, t-butyl (meth)acrylate, hexyl (meth)acrylate, 2-ethylhexyl (meth)acrylate, octyl (meth)acrylate or lauryl (meth) acrylate.

Process for Producing the Rubbers:

The process according to the invention for producing the nitrile rubbers by emulsion polymerization of at least one α,β-unsaturated nitrile monomer and at least one conjugated diene monomer is characterized in that
(i) the latex which contains the nitrile rubber and is obtained after the polymerization is coagulated using at least one aluminium salt, the coagulation being effected at a pH in the range from 1 to 4.5, preferably from 1 to 4, more preferably from 1 to 3.75 and especially from 1 to 3.5, and
(ii) the subsequent wash of the nitrile rubber is conducted at a pH in the range from 6 to 12, preferably from 6.25 to 11, more preferably from 6.5 to 10.5 and especially from 6.75 to 10.5.

The nitrile rubbers are produced by emulsion polymerization.

Emulsifiers used may be water-soluble salts of anionic emulsifiers or else uncharged emulsifiers. Preference is given to using anionic emulsifiers.

Anionic emulsifiers used may be modified resin acids which are obtained by dimerization, disproportionation, hydrogenation and modification of resin acid mixtures comprising abietic acid, neoabietic acid, palustric acid, levopimaric acid. A particularly preferred modified resin acid is disproportionated resin acid (Ullmann's Encyclopedia of Industrial Chemistry, 6th edition, volume 31, p. 345-355).

Other anionic emulsifiers used may be $C_6$-$C_{22}$ fatty acids. They may be fully saturated or contain one or more double bonds in the molecule. Examples of fatty acids are caproic acid, lauric acid, myristic acid, palmitic acid, stearic acid, oleic acid, linoleic acid, linolenic acid. The carboxylic acids are typically based on origin-specific oils or fats, for example castor oil, cottonseed, peanut oil, linseed oil, coconut fat, palm kernel oil, olive oil, rapeseed oil, soya oil, fish oil and bovine tallow etc. (Ullmann's Encyclopedia of Industrial Chemistry, 6th edition, volume 13, p. 75-108). Preferred carboxylic acids derive from coconut fatty acid and from bovine tallow, and are partly or fully hydrogenated.

Such carboxylic acids based on modified resin acids or fatty acids are used in the form of water-soluble lithium, sodium, potassium and ammonium salts. The sodium salts and potassium salts are preferred.

Anionic emulsifiers are additionally sulphonates, sulphates and phosphates bonded to an organic radical. Useful organic radicals include aliphatic radicals, aromatic radicals, alkylated aromatic radicals, fused aromatic radicals, and methylene-bridged aromatic radicals, where the methylene-bridged and fused aromatic radicals may additionally be alkylated. The length of the alkyl chains is 6 to 25 carbon atoms. The length of the alkyl chains bonded to the aromatic systems is between 3 and 12 carbon atoms.

The sulphates, sulphonates and phosphates are used in the form of lithium salts, sodium salts, potassium salts and ammonium salts. The sodium salts, potassium salts and ammonium salts are preferred.

Examples of sulphonates, sulphates and phosphates of this kind are sodium laurylsulphate, sodium alkylsulphonate, sodium alkylarylsulphonate, sodium salts of methylene-bridged arylsulphonates, sodium salts of alkylated naphthalenesulphonates, and the sodium salts of methylene-bridged naphthalenesulphonates, which may also be oligomerized, where the oligomerization level is between 2 and 10. Typically, the alkylated naphthalenesulphonic acids and the methylene-bridged (and optionally alkylated) naphthalenesulphonic acids we in the form of isomer mixtures which may also contain more than 1 sulphonic acid group (2 to 3 sulphonic acid groups) in the molecule. Particular preference is given to sodium laurylsulphate, sodium alkylsulphonate mixtures having 12 to 18 carbon atoms, sodium alkylarylsulphonates, sodium diisobutylenenaphthalenesulphonate, methylene-bridged polynaphthalenesulphonate mixtures and methylene-bridged arylsulphonate mixtures.

Uncharged emulsifiers derive from addition products of ethylene oxide and propylene oxide onto compounds having sufficiently acidic hydrogen. These include, for example, phenol, alkylated phenol and alkylated amines. The mean polymerization levels of the epoxides are between 2 and 20. Examples of uncharged emulsifiers are ethoxylated nonylphenols having 8, 10 and 12 ethylene oxide units. The uncharged emulsifiers are typically not used alone, but in combination with anionic emulsifiers.

Preference is given to the sodium and potassium salts of disproportionated abietic acid and partly hydrogenated fatty acid, and mixtures thereof, sodium laurylsulphate, sodium alkylsulphonates, sodium alkylbenzenesulphonate, and alkylated and methylene-bridged naphthalenesulphonic acids.

The emulsifiers are used in an amount of 0.2-15 parts by weight, preferably 0.5-12.5 parts by weight, more preferably 1.0-10 parts by weight, based on 100 parts by weight of monomer mixture.

The emulsion polymerization is conducted using the emulsifiers mentioned. If, on completion of the polymerization, latices having a tendency to premature self-coagulation because of a certain instability are obtained, said emulsifiers can also be used for post-stabilization of the latices. This may become necessary particularly prior to the removal of unconverted monomers by treatment with steam and before any storage of latex.

The emulsion polymerization is typically initiated using polymerization initiation which break down to free radicals. These include compounds containing an —O—O— unit (peroxo compounds) or an —N=N— unit (azo compound), or redox systems that derive therefrom.

Peroxidic Initiators used may, for example, be the following peroxo compounds having a —O—O— unit: hydrogen peroxide, peroxodisulphates, peroxodiphosphates, hydroperoxides, peracids, peresters, peracid anhydrides and peroxides having two organic radicals. Salts of peroxodisulphuric acid and of peroxodiphosphoric acid used may be sodium, potassium and ammonium salts. Suitable hydroperoxides are, for example, t-butyl hydroperoxide, cumene hydroperoxide, pinane hydroperoxide and p-menthane hydroperoxide. Suitable peroxides having two organic radicals we dibenzoyl peroxide, 2,4-dichlorobenzoyl peroxide, di-t-butyl peroxide, dicumyl peroxide, t-butyl perbenzoate, t-butyl peracetate. Preference is given to using p-menthane hydroperoxide or pinane hydroperoxide.

Redox systems used may be the systems which follow, composed of an oxidizing agent and a reducing agent. The choice of suitable amounts of oxidizing agent and reducing agent is sufficiently familiar to the person skilled in the art.

In the case of use of redox systems, salts of transition metal compounds such as iron, cobalt or nickel are frequently additionally used in combination with suitable complexing agents such as sodium ethylenediaminetetraacetate, sodium nitrilotriacetate and trisodium phosphate or tetrapotassium diphosphate.

As oxidizing agent, it is possible, for example, to use any peroxo compounds which have been mentioned above for the peroxidic initiators.

As reducing agent, it is possible in the process according to the invention to use, for example, the following: sodium formaldehydesulphoxylate, sodium benzaldehydesulphoxylate, reducing sugars, ascorbic acid, sulphenates, sulphinates, sulphoxylates, dithionite, sulphite, metabisulphite, disulphite, sugar, urea, thiourea, xanthogenates, thioxanthogenates, hydrazinium salts, amines and amine derivatives such as aniline, dimethylaniline, monoethanolamine, diethanolamine or triethanolamine. Preference is given to using sodium formaldehydesulphoxylate.

Preferred redox systems are, for example: 1) potassium peroxodisulphate in combination with triethanolamine, 2) ammonium peroxodiphosphate in combination with sodium metabisulphite ($Na_2S_2O_5$), 3) p-menthane hydroperoxide/sodium formaldehydesulphoxylate in combination with iron (II) sulphate ($FeSO_4*7\ H_2O$), sodium ethylenediaminoacetate and trisodium phosphate; 4) cumene hydroperoxide/sodium formaldehydesulphoxylate in combination with iron (II) sulphate ($FeSO_4*7\ H_2O$), sodium ethylenediaminoacetate and tetrapotassium diphosphate.

The amount of oxidizing agents is 0.001 to 1 part by weight based on 100 parts by weight of monomer. The molar amount of reducing agent is between 50% and 500% based on the molar amount of the oxidizing agent used.

The molar amount of complexing agent is based on the amount of transition metal used and is typically equimolar therewith.

To conduct the polymerization, all or individual components of the initiator system are metered in at the start of the polymerization or during the polymerization.

Addition of all and individual components of the initiator system in portions during the polymerization is preferred. Sequential addition can be used to control the reaction rate.

In addition, polymerization is frequently effected in the presence of what are called molecular weight regulators, which are generally alkyl thiols containing 9-16 carbon atoms. Such alkyl thiols or (isomer) mixtures of alkyl thiols are either commercially available or else are preparable by processes sufficiently well-described in the literature for the person skilled in the art.

The polymerization time is in the range from 5 h to 15 h and depends essentially on the acrylonitrile content of the monomer mixture and on the polymerization temperature.

The polymerization temperature is in the range from 0 to 50° C., preferably in the range from 5 to 45° C., more preferably in the range from 8 to 40° C.

On attainment of conversions in the range from 50 to 99%, preferably in the range from 65 to 95%, the polymerization is short-stopped.

For this purpose, a stopper is added to the reaction mixture. Suitable examples of these are dimethyl dithiocarbamate, sodium nitrite, mixtures of dimethyl dithiocarbamate and sodium nitrite, hydrazine and hydroxylamine and salts derived therefrom, such as hydrazinium sulphate and hydroxylammonium sulphate, diethylhydroxylamine, diisopropylhydroxylamine, water-soluble salts of hydroquinone, sodium dithionite, phenyl-α-naphthylamine and aromatic phenols such as tert-butylcatechol, or phenothiazine.

The amount of water used in the emulsion polymerization is in the range from 100 to 900 parts by weight, preferably in the range from 120 to 500 parts by weight and more preferably in the range from 150 to 400 parts by weight of water, based on 100 parts by weight of the monomer mixture.

In the emulsion polymerization, it is possible to add salts to the aqueous phase, in order to reduce the viscosity during the polymerization, to adjust the pH and also to buffer the pH. Typical salts used for this purpose are salts of monovalent metals in the form of potassium hydroxide and sodium hydroxide, sodium sulphate, sodium carbonate, sodium hydrogencarbonate, lithium chloride, sodium chloride and potassium chloride. Preference is given to sodium hydroxide and potassium hydroxide, sodium hydrogencarbonate, lithium chloride, sodium chloride and potassium chloride. The amounts of these electrolytes are in the range of 0 to 1 part by weight, preferably 0 to 0.5 part by weight, based on 100 parts by weight of the monomer mixture.

The polymerization can be performed either batchwise or else continuously in a stirred tank cascade.

To achieve homogeneous running of the polymerization, only a portion of the initiator system is used for the start of the polymerization and the rest is metered in during the polymerization. Typically, the polymerization is commenced with 10 to 80% by weight, preferably 30-50% by weight, of the total amount of initiator. It is also possible to subsequently meter in individual constituents of the initiator system.

If the intention is to produce chemically homogeneous products, further acrylonitrile or butadiene is metered in if the composition is to be outside the azeotropic butadiene/acrylonitrile ratio. Preference is given to further metered addition in the case of NBR types with acrylonitrile contents of 10% to 34% by weight, and in the case of the types with 40/6 to 50% by weight of acrylonitrile (W. Hofmann, "Nitrilkautschuk" [Nitrile Rubber], Berliner Union, Stuttgart, 1965, page 58 ff.). The subsequent metered addition is effected—as specified, for example, in DD 154 702—preferably under computer control on the basis of a computer program.

To remove unconverted monomers and volatile constituents, the short-stopped latex is subjected to a steam distillation. In this case, temperatures in the range from 70° C. to 150° C. are employed, the pressure being reduced in the case of temperatures of <100° C.

Before the volatile constituents are removed, the latex can be post-stabilized with emulsifier. For this purpose, the aforementioned emulsifiers are appropriately used in amounts of 0.1% to 2.5% by weight, preferably 0.5% to 2.0% by weight, based on 100 parts by weight of nitrile rubber.

Latex Coagulation:

Before or in the course of latex coagulation, one or more ageing stabilizers may be added to the latex. Suitable for this purpose are phenolic, aminic and also other ageing stabilizers.

Suitable phenolic ageing stabilizers are alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, 2,2'-methylenebis(6-tert-butyl)-p-cresol, poly(dicyclopentadiene-co-p-cresol), sterically hindered phenols containing ester groups, such as n-octadecyl β-(4-hydroxy-3,5-di-tert-butylphenyl)propionate, thioether-containing sterically hindered phenols, 2,2'-methylenebis(4-methyl-6-tert-butylphenol) (BPH), 2-methyl-4,6-bis(octylsulphanylmethyl)phenol and sterically hindered thiobisphenols. In particularly suitable embodiments, two or more ageing stabilizers are also added, for example a mixture of octadecyl-3-(3,5-di-tert-butyl-4-hydroxyphenyl)

propionate, poly(dicyclopentadiene-co-p-cresol) and 2-methyl-4,6-bis(octylsulphanylmethyl)phenol.

If discolouration of the rubber is unimportant, aminic ageing stabilizers are also used, for example mixtures of diaryl-p-phenylenediamines (DTPD), octylated diphenylamine (ODPA), phenyl-α-naphthylamine (PAN), phenyl-β-naphthylamine (PBN), preferably those based on phenylenediamine. Examples of phenylenediamines are N-isopropyl-N'-phenyl-p-phenyleneamine, N-1,3-dimethylbutyl-N'-phenyl-p-phenylenediamine (6PPD), N-1,4-dimethylpentyl-N'-phenyl-p-phenylenediamine (7PPD), N,N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD) etc.

The other ageing stabilizers include phosphites such as tris(nonylphenyl) phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are generally used in combination with phenolic ageing stabilizers. TMQ, MBI, and MMBI are mainly used for NBR types which are vulcanized by peroxidic means.

What is essential for the process of the invention is that the coagulation of the nitrile rubber is conducted using at least one aluminium salt.

Typically, at least one aluminium salt is used, which is an aluminium salt of a mono- or divalent anion, preferably an aluminium halide, nitrate, sulphate, hydrogencarbonate, carbonate, formate or acetate, more preferably an aluminium chloride or sulphate.

Of equally good suitability are, for example, aluminium chloride, aluminium sulphate, potassium aluminium sulphate (potassium alum), sodium aluminium sulphate (sodium alum) or any desired mixtures thereof.

The at least one aluminium salt is used in aqueous solution, the concentration of which, based on the at least one aluminium salt, is typically 40%-70% by weight, preferably 40% to 60% by weight.

This aluminium salt solution is used in such an amount that, based on 100 parts by weight of nitrile rubber, 0.5-50 parts by weight of aluminium salt are used, preferably 0.8%-40% by weight and more preferably 1.5%-20% by weight of salt, based on 100 parts by weight of nitrile rubber.

Typically, the NBR dispersion is added to the aluminium salt solution. It has been found to be useful to conduct this addition while stirring.

As well as the at least one aluminium salt, it is also possible to use precipitation aids in the coagulation. Useful precipitation aids include, for example, water-soluble polymers. These are nonionic, anionic or cationic.

Examples of nonionic polymeric precipitation aids are modified cellulose such as hydroxyalkyl cellulose or methyl cellulose, and adducts of ethylene oxide and propylene oxide onto compounds having acidic hydrogen. Examples of compounds having acidic hydrogen are: fatty acid, sugars such as sorbitol, mono- and di-fatty acid glycerides, phenol, alkylated phenols, (alkyl)phenol/formaldehyde condensates, etc. The addition products of ethylene oxide and propylene oxide onto these compounds may have random and block structure. Of these products, preference is given to those where solubility decreases with increasing temperature. Characteristic cloud points are in the range of 0 to 100° C., especially in the range from 20 to 70° C.

Examples of anionic polymeric precipitation aids are the homo- and copolymers of (meth)acrylic acid, maleic acid, maleic anhydride, etc. Preference is given to the sodium salt of polyacrylic acid.

Cationic polymeric precipitation aids are typically based on polyamines and on homo- and copolymers of (meth) acrylamide. Preference is given to polymethacrylamides and polyamines, especially based on epichlorohydrin and dimethylamine.

The amounts of polymeric precipitation aids are 0.01 to 5 parts by weight and preferably 0.05 to 2.5 parts by weight per 100 parts by weight of nitrile rubber.

The use of other precipitation aids and salts is also conceivable. However, it should be noted that it is possible without any problem to conduct the process of the invention with the desired success in the absence of additional precipitation aids and especially in the absence of $C_1$-$C_4$-alkyl celluloses, hydroxyalkyl celluloses, protein-like materials that originate from plants or polysaccharides, for example starch, or water-soluble polyamine compounds, and other coagulation salts, for example calcium or sodium salts.

The latex used for coagulation appropriately has an NBR solids concentration in the range from 1% by weight to 40% by weight, preferably in the range from 5% by weight to 35% by weight and more preferably in the range from 15% by weight to 30% by weight.

The latex coagulation is conducted within the temperature range from 10 to 100° C. Preferably, the latex coagulation is effected at a temperature of 20 to 90° C.

What is essential for the process of the invention is that the pH during the coagulation is, or if necessary is kept in the manner known to those skilled in the art, within the range from 1 to 4.5, preferably from 1 to 4, more preferably from 1 to 3.75 and especially preferably from 1 to 3.5.

The latex coagulation can be effected continuously or batchwise, preference being given to continuous operation.

Preference is given to conducting the coagulation in the process of the invention exclusively using aluminium salts. If one or more other non-aluminium-based precipitant salts are used in addition, the amount thereof is typically not more than 10% by weight, preferably not more than 5% by weight and more preferably not more than 3% by weight, based on the total amount of all the salts used for coagulation.

Wash of the Coagulated Rubber:

After the coagulation, the rubber is typically in the form of what are called crumbs. The wash of the coagulated rubber is therefore also referred to as "crumb wash". For this wash, it is possible to use either deionized water or non-deionized water. The wash is conducted at a temperature in the range from 15 to 90° C., preferably at a temperature in the range from 20 to 80° C. The amount of wash water is 0.5 to 20 parts by weight, preferably 1 to 10 parts by weight and more preferably 1 to 5 parts by weight, based on 100 parts by weight of rubber.

Preferably, the rubber crumbs are subjected to a multi-stage wash, with partial dewatering of the rubber crumbs between the individual wash stages. The residual moisture contents of the crumbs between the individual wash stages are in the range from 5% to 50% by weight, preferably in the range from 7% to 25% by weight. The number of wash stages is typically 1 to 7, preferably 1 to 3. The wash is conducted batchwise or continuously. Preference is given to using a multistage continuous process, preference being given to a countercurrent wash for conservative water management.

What is essential for the process of the invention is that the wash of the coagulated nitrile rubber is conducted at a pH in the range from 6 to 12, preferably from 6.25 to 11, more preferably from 6.5 to 10.5 and especially from 6.75 to 10.5.

Water Removal and Drying:

On conclusion of the wash, it has been found to be useful to dewater the nitrile rubber crumbs. The previously dewatered rubber is dried in a dryer, suitable examples being fluidized bed dryers or plate dryers. The drying temperatures are 80 to 150° C. Preference is given to drying with a temperature program, with lowering of the temperature toward the end of the drying operation.

The Invention therefore also provides for the use of the nitrile rubbers of the invention for production of vulcanizable mixtures comprising at least one nitrile rubber of the invention and at least one crosslinker. It is optionally possible for one or more further additives to be present.

These vulcanizable mixtures are produced by mixing at least one nitrile rubber of the invention with at least one crosslinker. It is optionally additionally possible to use one or more further additives.

Useful crosslinkers include, for example, peroxidic crosslinkers such as bis(2,4-dichlorobenzyl) peroxide, dibenzoyl peroxide, bis(4-chlorobenzoyl) peroxide, 1,1-bis(t-butylperoxy)-3,3,5-trimethylcyclohexane, tert-butyl perbenzoate, 2,2-bis(t-butylperoxy)butene, 4,4-di-tert-butyl peroxynonylvalerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)-3-hexyne.

Other additions that can also be used with advantage, alongside these peroxidic crosslinking agents, are those that can increase crosslinking yield: suitable examples thereof include triallyl isocyanurate, triallyl cyanurate, trimethylolpropane tri(meth)acrylate, triallyltrimellitate, ethylene glycol dimethacrylate, butanediol dimethacrylate, trimethylolpropane trimethacrylate, zinc diacrylate, zinc dimethacrylate, 1,2-polybutadiene or N,N'-m-phenylenedimaleimide.

The total amount of the crosslinker(s) is typically in the range from 1 to 20 parts by weight, preferably in the range from 1.5 to 15 parts by weight and more preferably in the range from 2 to 10 parts by weight, based on 100 parts by weight of the nitrile rubber.

Crosslinkers used may also be sulphur in elemental soluble or insoluble form, or sulphur donors.

Examples of useful sulphur donors include dimorpholyl disulphide (DTDM), 2-morpholinodithiobenzothiazole (MBSS), caprolactam disulphide, dipentamethylenethiuram tetrasulphide (DPTT) and tetramethylthiuram disulphide (TMTD).

It is also possible to use further additions which can help to increase the crosslinking yield in the sulphur vulcanization of the nitrile rubbers of the invention. In principle, the crosslinking can also be effected with sulphur or sulphur donors alone.

Conversely, crosslinking of the nitrile rubbers of the invention can also be effected only in the presence of the abovementioned additions, i.e. without addition of elemental sulphur or sulphur donors.

Suitable additions which can help to increase the crosslinking yield are, for example, dithiocarbamates, thiurams, thiazoles, sulphenamides, xanthogenates, guanidine derivatives, caprolactams and thiourea derivatives.

Dithiocarbamates used may be, for example: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (ZSMC), tellurium diethyldithiocarbamate, nickel dibutyldithiocarbamate, nickel dimethyldithiocarbamate and zinc diisononyldithiocarbamate.

Thiurams used may be, for example: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

Thiazoles used may be, for example: 2-mercaptobenzothiazole (MBT), dibenzothiazyl disulphide (MBTS), zinc mercaptobenzothiazole (ZMBT) and copper 2-mercaptobenzothiazole.

Sulphenamide derivatives used may be, for example: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbomyl-N-oxyethylenesudphenamide.

Xanthogenates used may be, for example: sodium dibutylxanthogenate, zinc isopropyldibutylxanthogenate and zinc dibutylxanthogenate.

Guanidine derivatives used may be, for example: diphenylguanidine (DPG), di-o-tolylguanidine (DOTG) and o-tolylbiguanide (OTBG).

Dithiophosphates used may be, for example: zinc dialkyldithiophosphates (chain length of the alkyl radicals $C_2$ to $C_{16}$), copper dialkyldithiophosphates (chain length of the alkyl radicals $C_2$ to $C_{16}$) and dithiophosphoryl polysulphide.

A caprolactam used may be, for example, dithiobiscaprolactam.

Thiourea derivatives used may be, for example, N,N'-diphenylthiourea (DPTU), diethylthiourea (DETU) and ethylenethiourea (ETU).

Likewise suitable as additions are, for example: zinc diaminodiisocyanate, hexamethylenetetramine, 1,3-bis(citraconimidomethyl)benzene and cyclic disulphanes.

The additions and also the crosslinking agents mentioned can be used either individually or in mixtures. Preference is given to using the following substances for the crosslinking of the nitrile rubbers: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkyldithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinking agents and aforementioned additions can each be used in amounts of about 0.05 to 10 parts by weight, preferably 0.1 to 8 parts by weight, especially 0.5 to 5 parts by weight (single dose, based in each case on the active substance), based on 100 parts by weight of nitrile rubber.

In the inventive sulphur crosslinking, it may also be advisable, in addition to the crosslinking agents and the abovementioned additions, also to use further inorganic or organic substances as well, for example: zinc oxide, zinc carbonate, lead oxide, magnesium oxide, saturated or unsaturated organic fatty acids and zinc salts thereof, polyalcohols, amino alcohols, for example triethanolamine, and amines, for example dibutylamine, dicyclohexylamine, cyclohexylethylamine and polyether amines.

In addition, it is also possible to use scorch retardants. These include cyclohexylthiophthalimide (CTP), N,N'-dinitrosopentamethylenetetramine (DNPT), phthalic anhydride (PTA) and diphenylnitrosamine. Preference is given to cyclohexylthiophthalimide (CTP).

As well as the addition of the crosslinker(s), the nitrile rubber of the invention may also be mixed with further customary rubber additives.

These include, for example, the typical substances that are sufficiently well known to those skilled in the art, such as fillers, filler activators, antiozonants, ageing stabilizers, antioxidants, processing aids, extender oils, plasticizers, reinforcing materials and mould release agents.

Filers used may, for example, be carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form), or silicates. The amount of fillers is typically in the range of 1-200 parts by weight, preferably 1-180 parts by weight, more preferably 1 to 150 parts by weight, based on 100 parts by weight of the nitrile rubber.

Useful filler activators include organic silanes in particular, for example vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadocyl)methyldimethoxysilane. Further filler activators are, for example, interface-active substances such as triethanolamine and ethylene glycols with molecular weights of 74 to 10 000 g/mol. The amount of filler activators is typically 0 to 10 parts by weight, based on 100 parts by weight of the nitrile rubber.

Ageing stabilizers added to the vulcanizable mixtures may be those already described in the context of latex coagulation in this application. They are typically used in amounts of 0 to 5 parts by weight, preferably 0.5 to 3 parts by weight, based on 100 parts by weight of the nitrile rubber.

Examples of useful mould release agents include: saturated and partly unsaturated fatty acids and oleic acids and derivatives thereof (fatty acid esters, fatty acid salts, fatty alcohols, fatty acid amides), which are preferably used as a mixture constituent, and also products applicable to the mould surface, for example products based on low molecular weight silicone compounds, products based on fluoropolymers and products based on phenol resins.

The mould release agents are used as a mixture constituent in amounts of 0 to 10 parts by weight, preferably of 0.5 to 5 parts by weight, based on 100 parts by weight of the nitrile rubber.

Another possibility is reinforcement with strengthening agents (fibres) made of glass, according to the teaching of U.S. Pat. No. 4,826,721, and another is reinforcement by cords, woven fabrics, fibres made of aliphatic and aromatic polyamides (Nylon®, Aramid@), polyesters and natural fibre products.

The Invention further provides a process for producing mouldings based on at least one nitrile rubber of the invention, which is characterized in that the above-described vulcanizable mixture is vulcanized in a shaping process, more preferably employing an injection moulding process.

The invention thus likewise provides the specific moulding obtainable by the aforementioned vulcanization process.

This process makes it possible to produce a multitude of mouldings, for example a seal, a cap, a hose or a membrane. More particularly, the aluminium-precipitated nitrile rubbers of the invention are suitable for production of a power steering hose, of textile-reinforced hoses, of a hydraulic or fuel hose, of pump stators, of a flat gasket, of a large-area gasket, of rubberized fabric, of a thermal insulation hose (with or without added PVC), of an oil cooler hose, of flexible fuel tanks or of a pump membrane.

Metathesis and Hydrogenation of Nitrile Rubbers:

It is also possible that the preparation of the nitrile rubbers is followed by (i) a metathesis reaction to reduce the molecular weight of the nitrile rubber or (ii) a metathesis reaction and a subsequent hydrogenation or (iii) just a hydrogenation. These metathesis or hydrogenation reactions are sufficiently well-known to those skilled in the art and are described in the literature. Metathesis is known, for example, from WO-A-02/100941 and WO-A-02/100905 and can be used to reduce the molecular weight.

The hydrogenation can be performed using homogeneous or heterogeneous hydrogenation catalysts. The catalysts used are based typically on rhodium, ruthenium or titanium, but it is also possible to use platinum, iridium, palladium, rhenium, ruthenium, osmium, cobalt or copper, either as the metal or else preferably in the form of metal compounds (see, for example, U.S. Pat. No. 3,700,637, DE-A-25 39132, EP-A-0 134 023, DE-A-35 41689, DE-A-35 40 918, EP-A-0 29 386, DE-A-35 29 252, DE-A-34 33 392, U.S. Pat. Nos. 4,464,515 and 4,503,196).

Suitable catalysts and solvents for a hydrogenation in homogeneous phase are described hereinafter and are also known from DE-A-25 39 132 and EP-A-0 471 250. The selective hydrogenation can be achieved, for example, in the presence of a rhodium or ruthenium catalyst. It is possible to use, for example, a catalyst of the general formula

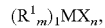

in which M is ruthenium or rhodium, $R^1$ is the same or different and is a $C_1$-$C_8$ alkyl group, a $C_4$-$C_8$ cycloalkyl group, a $C_6$-$C_{15}$ aryl group or a $C_7$-$C_{15}$ aralkyl group. B is phosphorus, arsenic, sulphur or a sulphoxide group S=O, X is hydrogen or an anion, preferably halogen and more preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride, and also tetrakis(triphenylphosphine)rhodium hydride of the formula $(C_6H_5)_3P)_4RhH$ and the corresponding compounds in which the triphenylphosphine has been replaced fully or partly by tricyclohexylphosphine. The catalyst can be used in small amounts. An amount in the range of 0.01-1% by weight, preferably in the range of 0.03-0.5% by weight and more preferably in the range of 0.1-0.3% by weight, based on the weight of the polymer, is suitable.

It is typically advisable to use the catalyst together with a cocatalyst which is a ligand of the formula $R^1{}_mB$ where $R^1$, m and B are each as defined above for the catalyst. Preferably, m is 3, B is phosphorus and the $R^1$ radicals may be the same or different. The cocatalysts preferably have trialkyl, tricycloalkyl, triaryl, triaralkyl, diaryl monoalkyl, diaryl monocycloalkyl, dialkyl monoaryl, dialkyl monocycloalkyl, dicycloalkyl monoaryl or dicycloalkyl monoaryl radicals.

Examples of cocatalysts can be found, for example, in U.S. Pat. No. 4,631,315. A preferred cocatalyst is triphenylphosphine. The cocatalyst is used preferably in amounts within a range of 0.3%-5% by weight, preferably in the range of 0.5%-4% by weight, based on the weight of the nitrile rubber to be hydrogenated. Preferably, in addition, the weight ratio of the rhodium catalyst to the cocatalyst is in the range from 1:3 to 1:55, more preferably in the range from 1:5 to 1:45, based on 100 parts by weight of the nitrile rubber to be hydrogenated; preferably 0.1 to 33 parts by weight of the cocatalyst, more preferably 0.5 to 20 and even more preferably 1 to 5 parts by weight, especially more than 2 but less than 5 parts by weight, of cocatalyst based on 100 parts by weight of the nitrile rubber to be hydrogenated, are used.

The practical conduct of the hydrogenation is known to those skilled in the art from U.S. Pat. No. 6,683,136. It is effected typically by contacting the nitrile rubber to be hydrogenated with hydrogen in a solvent such as toluene or monochlorobenzene at a temperature in the range from 100 to 150° C. and a pressure in the range from 50 to 150 bar for 2 to 10 h.

Hydrogenation is understood in the context of this invention to mean a conversion of the double bonds present in the starting nitrile rubber to an extent of at least 50%, preferably 70-100%, more preferably 80-100%.

In the case of use of heterogeneous catalysts, these are typically supported catalysts based on palladium, which are supported, for example, on charcoal, silica, calcium carbonate or barium sulphate.

EXAMPLES

I Analysis

The nitrogen content for determination of the acrylonitrile content (ACN content) in the nitrile rubbers is determined to DIN 53 625 according to Kjeldahl. Due to the content of polar comonomers, the nitrile rubbers are typically >85% by weight soluble in methyl ethyl ketone at 20° C.

The values for the Mooney viscosity (ML 1+4@100° C.) are determined in each case by means of a shearing disc viscometer in accordance with DIN 53523/3 or ASTM D 1646 at 100° C. Uncalendered ("unmassed") samples are used.

The dried NBR rubbers were characterized via the Mooney viscosity before and after hot-air storage at 100° C. for 48 hours; in other words, the Mooney viscosity was determined once directly after the drying (i.e. before the hot-air storage) and subsequently after hot-air ageing at 100° C. for 48 hours.

For further characterization, the colour of the aged rubber was assessed. The colour assessment of the aged rubber samples was made on a scale of 1-10, 1 corresponding to the colour of the unaged rubber and 10 to complete blackening.

The determination of the aluminium content was made by digesting 0.5 g of the nitrile rubbers by dry ashing at 550° C. in a platinum crucible with subsequent dissolution of the ash in hydrochloric acid. After suitable dilution of the digestion solution with deionized water, the aluminium content was determined by ICP-OES (inductively coupled plasma-optical emission spectrometry) at a wavelength of 309.271 nm against calibration solutions adjusted with an acid matrix. According to the concentration of the elements in the digestion solution and/or sensitivity of the measuring instrument used, the concentrations of the sample solutions for each of the wavelengths used were fitted to the linear range of the calibration (B. Welz "Atomic Absorption Spectrometry", 2nd Ed., Verlag Chemie, Weinheim 1965).

The aluminium index E, reported in [ppm/MU], is calculated from the aluminium content in ppm per Mooney unit, based on the nitrile rubber.

Scorch stability can be measured via the scorch characteristics and the scorch time $t_5$ thereof to DIN53523. In this context, the scorch time $t_5$ describes the time in minutes from the commencement of measurement until the Mooney viscosity rises by 5 Mooney units above the viscosity minimum at the given temperature.

II Production of the Nitrile Rubber Latices for Examples A1-A18

The polymerization was effected batchwise in an autoclave with a stirrer system. In each of the autoclave batches, the monomer mixture specified in Table 1, water and EDTA in an equimolar amount based on the Fe(II) were used. A portion of the amount of water was initially charged together with the emulsifier in the autoclave and purged with a nitrogen stream. Thereafter, the destabilized monomers and the amounts of the molecular weight regulator specified in Table 1 were added and the reactor was closed. After the reactor contents had been brought to temperature, the polymerizations were started by the addition of aqueous solutions of iron(II) salts (in the form of premix solutions) and of para-menthane hydroperoxide (Trigonox® NT50).

The premix solution contained 0.986 g of Fe(II)SO$_4$*7 H$_2$O and 2.0 g of Rongalit® C in 400 g of water.

The course of the polymerization was monitored by gravimetric determinations of conversion. On attainment of the conversions reported in Table 1, the polymerization was short-stopped by adding an aqueous solution of diethylhydroxylamine. Unconverted monomers were removed by means of steam distillation.

TABLE 1

Recipe for the emulsion polymerization for preparation of the NBR latices A1-A18

| Nitrile rubber | Latex for examples A1-A12 | Latex for examples A13-A14 | Latex for examples A15-A16 | Latex for examples A17-A18 |
|---|---|---|---|---|
| Butadiene | 44.2 | 73.9 | 37.0 | 67.5 |
| Acrylonitrile | 55.8 | 26.1 | 63.0 | 32.5 |
| Total amount of water | 220 | 170 | 200 | 200 |
| Fatty acid | | 2.0 | | |
| Oleic acid | 1.4 | | 1.4 | 1.4 |
| Resin acid [1] | 0.6 | | 0.6 | 0.6 |
| AOS [2] | 0.4 | | 0.4 | 0.4 |
| Tert-TDM [3] | 0.6 | 0.25 | 0.61 | 0.46 |
| Polymerization temperature [° C.] | 13.0 ± 3 | 13.0 ± 3 | 13.0 ± 3 | 13.0 ± 3 |
| Polymerization conversion [%] | 73 | 75 | 68 | 75 |
| Polymerization time [h] | 7 | 17 | 8.3 | 8.3 |

[1] sodium salt of the disproportionated resin acid, CAS 61790-51-0
[2] AOS: sodium α olefinsulphonate
[3] tert-TDM: tert-dodecyl mercaptan III Aluminium Precipitation of NBR Rubbers, Example A1-A12

Prior to the coagulation of each NBR latex, a 50% dispersion of Vulkanox® BKF (0.3% by weight of Vulkanox® BKF based on NBR solids) was added to each. A short-stopped aqueous NBR latex dispersion is used, having an NBR solids content of 18% by weight, and where the polymer component in the NBR latex has a content of 44% by weight based on acrylonitrile monomer, and 56% by weight based on the butadiene monomer. The NBR dispersion is added gradually to an aluminium sulphate solution (T=70° C.) at the pH specified in the table and stirred vigorously. The concentration of the aluminium sulphate solutions is chosen such that homogeneous crumbs of the NBR rubber are obtained. The amounts of aluminium sulphate solutions based on the NBR rubber are 9+/−1 phr and are specified in Table 2 or 3. The resultant raw rubber is washed with water (T=60° C.) at the pH specified in Table 2 or 3 and dried in a vacuum oven at 60° C. for 6 hours, such that the residual moisture content is <0.6%.

being disproportionately high in the case of the comparative examples. The best aluminium index E, being the lowest salt burden per unit Mooney viscosity, is achieved only through controlled coagulation at an acidic pH in the range from 1 to 4.5 and a subsequent wash within a range from 6 to 12. It is apparent from Comparative Example I that a small deviation

TABLE 2

Aluminium precipitation of nitrile rubber at various pH values
(Examples A1 to A6; inventive examples are identified by "*")

| | | | | | | Example | | | |
|---|---|---|---|---|---|---|---|---|---|
| | | | | A1 | A2* | A3* | A4 | A5 | A6 |
| Coagulation | Temperature | ° C. | | 70 | 70 | 70 | 70 | 70 | 70 |
| | pH | | | 3.0 | 3.0 | 3.0 | 5.0 | 5.0 | 5.0 |
| | Precipitant salt | | | | | $Al_2(SO_4)_3$ | | | |
| | Amount of precipitant salt | phr | | 9 | 9 | 9 | 9 | 9 | 9 |
| Wash | Temperature | ° C. | | 60 | 60 | 60 | 60 | 60 | 60 |
| | pH | | | 5.1 | 6.9 | 10.0 | 4.8 | 6.8 | 9.9 |
| Testing | | | | | | | | | |
| Ion content | Al | ppm | | 1550 | 1640 | 1440 | 14550 | 14750 | 13250 |
| Molecular weights | GPC | Mn | | — | 70922 | — | — | 71239 | — |
| | | Mw | | — | 189329 | — | — | 187693 | — |
| Polydispersity index (PDI = Mw/Mn) | | PDI | | — | 2.7 | — | — | 2.6 | — |
| Mooney viscosity | | MU | | 44 | 47 | 42 | 64 | 64 | 67 |
| Aluminium index E | | ppm/MU | | 35.2 | 34.9 | 34.3 | 227.3 | 230.5 | 197.8 |
| | | Testing after ageing 48 h/110° C. | | | | | | | |
| Mooney viscosity | | MU | | 47 | 49 | 46 | 63 | 63 | 65 |
| Colour assessment | | | | 6 | 4 | 3 | 2 | 2 | 3 |

TABLE 3

Aluminium precipitation of nitrile rubber at various pH values
(Examples A7 to A12; all comparative examples)

| | | | | Example | | | | | |
|---|---|---|---|---|---|---|---|---|---|
| | | | | A7 | A8 | A9 | A10 | A11 | A12 |
| Coagulation | Temperature | ° C. | | 70 | 70 | 70 | 70 | 70 | 70 |
| | pH | | | 7.0 | 7.0 | 7.0 | 10.0 | 10.0 | 10.0 |
| | Precipitant salt | | | | | $Al_2(SO_4)_3$ | | | |
| | Amount of precipitant salt | phr | | 9 | 9 | 9 | 11 | 11 | 11 |
| Wash | Temperature | ° C. | | 60 | 60 | 60 | 60 | 60 | 60 |
| | pH | | | 5.1 | 6.9 | 9.9 | 5.2 | 7.0 | 10.0 |
| Testing | | | | | | | | | |
| Ion content | Al | ppm | | 15100 | 14900 | 10800 | 10100 | 6300 | 5700 |
| Molecular weights | GPC | Mn | | — | 67906 | — | — | 73191 | — |
| | | Mw | | — | 189077 | — | — | 190062 | — |
| Polydispersity index (PDI = Mw/Mn) | | PDI | | — | 2.8 | — | — | 2.6 | — |
| Mooney viscosity | | Mu | | 63 | 66 | 67 | 59 | 59 | 58 |
| Aluminium index E | | ppm/Mu | | 239.7 | 225.8 | 161.2 | 171.2 | 106.8 | 98.3 |
| | | Ageing 48 h/110° C. | | | | | | | |
| Mooney viscosity | | Mu | | 62 | 64 | 62 | 60 | 56 | 57 |
| Colour assessment | | | | 2 | 2 | 3 | 7 | 9 | 10 |

As expected, all the aluminium-precipitated samples show the same molecular weight in the GPC analysis. In the case of the Mooney viscosities, however, values between inventive examples and comparative examples are measured, which differ by up to 20 MU. This must presumably be attributable to the washing and non-removal of the aluminium salts which remain in the rubber in large amounts. The Mooney viscosity measured thus shows a combination of the desired viscous proportion of the polymers and a proportion of the undesirable salts, the latter in the pH of the wash of 5.1, outside the range from 6 to 12 of relevance in accordance with the invention, leads to a substantial deterioration in colour assessment for the aged samples. It is also apparent that even a higher amount of aluminium sulphate solutions (phr) in the precipitation (Examples A10-A12 as compared with A7-A9) does not necessarily increase the amount of aluminium ions remaining in the rubber.

After hot-air ageing of the rubbers, great colour differences are observed between the aged samples. The smallest colour difference after ageing of the rubbers is present in Examples A3-A9, but this is misleading in that this apparently positive result in these comparative examples is caused by the excessively high aluminium salt content. It is apparent that the rubber after the ageing test becomes ever lighter in colour with increasing salt content, since the aluminium salts lighten the rubber colour, but with simultaneous substantial losses in the other properties. The best colour effect with simultaneously minimum salt burden is surprisingly achieved only by coagulation at a pH in the range from 1 to 4.5 and a subsequent wash within a range from 6 to 12.

III Aluminum Precipitation of NBR Rubbers. Examples A13-A18

Prior to the coagulation of each NBR latex, a 50% dispersion of Vulkanox® BKF (0.4% by weight of Vulkanox® BKF based on NBR solids) was added to each. A short-stopped aqueous NBR latex dispersion is used, having an NBR solids content of 18.4% by weight, and where the polymer component in the NBR latex has the Mooney viscosity reported in Table 4 and the contents based on the acrylonitrile and butadiene that are likewise mentioned in Table 4. The dispersion is added gradually to an aluminium sulphate solution at the pH and temperature specified in Table 4 and stirred vigorously. The concentration of the aluminium sulphate solutions is chosen such that homogeneous crumbs of the NBR rubber are obtained. The amounts of aluminium sulphate solutions based on the rubber are reported in Table 4. The resultant raw rubber is washed with water at the pH and temperature specified in Table 4 and dried in a vacuum oven at 60° C. for 16 hours, such that the residual moisture content is <0.6%.

Table 4 shows that aluminium precipitation at an acidic pH of 3 with a subsequent basic wash in the pH range of 6 to 12 which is of relevance in accordance with the invention affords rubbers having only a low salt content, additionally having a low aluminium index E and also exhibiting good colour stability after ageing. It is advantageous that this is true both of nitrile rubbers having a very high acrylonitrile content and of those having a very low acrylonitrile content, since the latter are particularly sensitive.

IV Production of Vulcanizates of the Nitrile Rubbers V1-V18

Nitrile rubbers A1 to A18 were used as described below to produce vulcanizates V1 to V18. The constituents of the vulcanizable mixtures are based on 100 parts of rubber and are reported in Table 5. The vulcanizate number in Table 5 corresponds in each case to the nitrile rubber having the same number. Nitrile rubber A1 is used to produce vulcanizate V1, nitrile rubber A2 to produce vulcanizate V2, etc.

The mixtures were produced in a Banbury mixer to ISO4658, section 5.2.3.3. For this purpose, the rubber and all the additives specified in Table 4 were mixed in each case at a maximum temperature of up to 60° C. for a total of 5 minutes.

TABLE 5

Composition of the vulcanizable mixtures for vulcanizates V1-V18

| | Vulcanizable mixture for | | | |
|---|---|---|---|---|
| | V1-V12 | V13-V14 | V15-V16 | V17-V18 |
| Polymer A1-A18* | 100 | 100 | 100 | 100 |
| IRB 7 [1] | 40 | 40 | 40 | 40 |
| EDENOR C 18 98-100 [2] | 1 | 1 | 1 | 1 |
| SULFUR SPIDER [3] | 1.54 | 1.54 | 1.54 | 1.54 |

TABLE 4

Aluminium precipitation of nitrile rubber in the case of coagulation at acidic pH and washing at basic pH (Examples A13 to A18; all inventive examples)

| | | | Example | | | | | |
|---|---|---|---|---|---|---|---|---|
| | | | A13* | A14* | A15* | A16* | A17* | A18* |
| Coagulation | Temperature | ° C. | 60 | 60 | 65 | 65 | 60 | 60 |
| | pH | | | | 3.0 | | | |
| | Precipitant salt | | | | $Al_2(SO_4)_3$ | | | |
| | Amount of precipitant salt | phr | 7 | 7 | 7 | 7 | 6 | 6 |
| Wash | Temperature | ° C. | 60 | 60 | 65 | 65 | 60 | 60 |
| | pH | | 7.1 | 10.3 | 7.1 | 9.9 | 7.0 | 10.0 |
| Testing | | | | | | | | |
| Ion content | Al | ppm | 1096 | 880 | 1626 | 1380 | 1216 | 1137 |
| ACN content | | % | 28 | 28 | 49 | 49 | 28.5 | 28.5 |
| Mooney viscosity | | Mu | 95 | 99 | 61 | 66 | 51 | 53 |
| Aluminium index E | | ppm/Mu | 11.5 | 8.9 | 26.7 | 20.9 | 23.8 | 21.5 |
| Ageing 48 h/110° C. | | | | | | | | |
| Mooney viscosity | | Mu | 109 | 97 | 78 | 79 | 81 | 70 |
| Colour assessment | | | 4 | 4 | 4 | 3 | 4 | 4 |

TABLE 5-continued

Composition of the vulcanizable mixtures for vulcanizates V1-V18

|  |  | Vulcanizable mixture for | | | |
|---|---|---|---|---|---|
|  |  | V1-V12 | V13-V14 | V15-V16 | V17-V18 |
| VULKACIT NZ/EGC [4] |  | 0.7 | 0.7 | 0.7 | 0.7 |
| ZINKOXYD AKTIV [5] |  | 3 | 3 | 3 | 3 |
| Total | phr | 146.24 | 146.24 | 146.24 | 146.24 |
| Density | g/ccm | 1.167 | 1.129 | 1.176 | 1.139 |

[1] IRB7 — carbon black from Sid Richardson Carbon Co.
[2] Edenor C 1898-100 — stearic acid from Caldic
[3] sulfur Spider — sulphur (S8) from Krahn Chemie GmbH
[4] Vulkacit ® NZ/EG-C — N-Cyclohexyl-2-benzothiazolesulphenamide (CBS) from Lanxess Deutschland GmbH
[5] Zinkoxid Aktiv — zinc oxide from Lanxess Deutschland GmbH The resultant vulcanizates had the scorch time $t_5$ to DIN 53523 reported in Tables 6 to 8 and the Mooney scorch at 140° C. (MS $t_5$/140° C.) reported. It is apparent that the polymers having an aluminium index E of not more than 35 ppm/MU have a longer scorch time MS $t_3$/140° C. than non-inventive samples; in other words, the former have very good processing reliability, as expected for aluminium-precipitated types. Aluminium-precipitated types which are not acid-precipitated within the range of values specified and washed at a basic pH within the range of values specified have very short scorch times and additionally high aluminium contents. ("nd" in Table 7 stands for "not determined")

TABLE 6

Mooney scorch of aluminium-precipitated nitrile rubbers

| Example |  |  | V1 | V2* | V3* | V4 | V5 | V6 |
|---|---|---|---|---|---|---|---|---|
| Aluminium index E | ppm/MU |  | 35.2 | 34.9 | 34.3 | 227.3 | 230.5 | 197.8 |
| Mooney scorch | MS $t_5$/140° C. | min | 17.1 | 17.8 | 17.2 | 16.6 | 16.3 | 13.9 |

TABLE 7

Mooney scorch of aluminium-precipitated nitrile rubbers

| Example |  |  | V7 | V8 | V9 | V10 | V11 | V12 |
|---|---|---|---|---|---|---|---|---|
| Aluminium index E | ppm/MU |  | 239.7 | 225.8 | 161.2 | 171.2 | 106.8 | 98.3 |
| Mooney scorch | MS $t_5$/140° C. | min | 16.0 | 15.2 | 12.1 | 11.4 | nd | 8.4 |

TABLE 8

Mooney scorch of aluminium-precipitated nitrile rubbers

| Example |  |  | V13* | V14* | V15* | V16* | V17* | V18* |
|---|---|---|---|---|---|---|---|---|
| Aluminium index E | ppm/MU |  | 11.5 | 8.9 | 26.7 | 20.9 | 23.8 | 21.5 |
| Mooney scorch | MS $t_5$/140° C. | min | 9.6 | 9.7 | 13.6 | 14.6 | 13.0 | 12.7 |

What is claimed is:

1. A nitrile rubber comprising repeat units of at least one α,β-unsaturated nitrile monomer and of at least one conjugated diene monomer, wherein the nitrile rubber has an aluminium index E according to the general formula (I) of 7 ppm/MU to not more than 35.0 ppm/MU, based on the nitrile rubber, $$E = \frac{[\text{Aluminium}]}{\text{Mooney viscosity}} \quad (I)$$

in which

[aluminium] is the aluminium content of the nitrile rubber in ppm and

Mooney viscosity is the value of the Mooney viscosity (ML 1+4 at 100° C.) of the nitrile rubber, reported in Mooney units (MU), and wherein the rubber is not hydrogenated.

2. The nitrile rubber according to claim 1, additionally comprising repeat units of one or more further copolymerizable monomers.

3. The nitrile rubber according to claim 1, wherein the nitrile rubber is a copolymer of acrylonitrile and 1,3-butadiene.

4. The nitrile rubber according claim 1, wherein the proportions of, or the sum total of the conjugated dienes is 20% to 95% by weight, based on the nitrile rubber, and the proportion of or the sum total of the α,β-unsaturated nitriles is in the range from 5% to 80% by weight, based on the nitrile rubber, where the proportions of all the monomers add up to 100% by weight in each case.

5. A process for producing the nitrile rubber according to claim 1, by emulsion polymerization of at least one α,β-unsaturated nitrile monomer and at least one conjugated diene monomer, the process comprising:

(i) after the polymerization, coagulating the latex which contains the nitrile rubber using at least one aluminium salt, wherein the coagulating is effected at a pH of 1 to 4.5, wherein the at least one aluminium salt is used in the form of an aqueous solution which has a concentration of 40%-70% by weight, and is used in such an amount that, based on 100 parts by weight of nitrile rubber, 0.5-50 parts by weight of aluminium salt are used based on 100 parts by weight of nitrile rubber, and (ii) subsequently washing the nitrile rubber at a pH of 6 to 12 with an amount of wash water that is 0.5 to 20 parts by weight, based on 100 parts by weight of rubber.

6. The process according to claim 5, wherein the at least one aluminium salt is an aluminium salt of a mono- or divalent anion.

7. The process according to claim 5, wherein the at least one aluminium salt is aluminium chloride, aluminium sulphate, potassium aluminium sulphate (potassium alum), sodium aluminium sulphate (sodium alum) or any mixtures thereof.

8. The process according to claim 5, wherein the at least one salt additionally comprises one or more other, non-aluminium-based precipitation salts in an amount of not more than 10% by weight, based on the total amount of all the salts used for coagulation.

9. A vulcanizable mixture comprising the nitrile rubber according to claim 1 and at least one crosslinker.

10. A process for producing the vulcanizable mixture according to claim 9, the process comprising mixing the nitrile rubber with at least one crosslinker.

11. A process for producing vulcanizates, the process comprising vulcanizing the vulcanizable mixture according to claim 9.

12. Vulcanizates obtained by the process according to claim 11.

13. The vulcanizates according to claim 12, wherein the vulcanizates are mouldings comprising seals, caps, hoses and membranes.

14. The nitrile rubber according to claim 1, wherein:
the aluminium index E is 7 ppm/MU to less than 35 ppm/MU, based on the nitrile rubber;
the proportion of, or the sum total of the conjugated dienes is 40% to 90% by weight, based on the nitrile rubber, and
the proportion of, or the sum total of the $\alpha,\beta$-unsaturated nitriles is 10% to 60% by weight.

15. The nitrile rubber according to claim 1, wherein:
the proportion of, or the sum total of the conjugated dienes is 60% to 85% by weight, based on the nitrile rubber, and
the proportion of, or the sum total of the $\alpha,\beta$-unsaturated nitriles is 15% to 40% by weight.

* * * * *